No. 616,878. Patented Jan. 3, 1899.
M. A. BATSON & C. G. SAWTELLE, Jr.
GRADE DELINEATOR.
(Application filed Sept. 3, 1896.)

(No Model.) 2 Sheets—Sheet 1.

No. 616,878. Patented Jan. 3, 1899.
M. A. BATSON & C. G. SAWTELLE, Jr.
GRADE DELINEATOR.
(Application filed Sept. 3, 1896.)
(No Model.) 2 Sheets—Sheet 2.

WITNESSES:
INVENTORS
Matthew A Batson
Charles G Sawtelle
by Edgar Tate
ATTORNEYS.

UNITED STATES PATENT OFFICE.

MATTHEW ARLINGTON BATSON AND CHARLES GREENE SAWTELLE, JR., OF NEW YORK, N. Y.

GRADE-DELINEATOR.

SPECIFICATION forming part of Letters Patent No. 616,878, dated January 3, 1899.

Application filed September 3, 1896. Serial No. 604,730. (No model.)

*To all whom it may concern:*

Be it known that we, MATTHEW ARLINGTON BATSON and CHARLES GREENE SAWTELLE, Jr., citizens of the United States, and residents of New York, (Willets Point,) in the county of Queens and State of New York, have invented certain new and useful Improvements in Grade-Delineators, of which the following is a specification, reference being had to the accompanying drawings, forming a part thereof, in which similar numerals of reference indicate corresponding parts wherever found throughout the several views.

The invention, subject of our present application, is an improvement in grade-delineators or devices adapted to be attached to a vehicle and constructed with the capability of indicating and recording the distance traveled and the grade of the road over which the vehicle passes.

The improvement resides in the combination of instrumentalities, hereinafter more fully set forth, by which a more accurate record of grades is secured and in the details of construction of the device.

The main feature of novelty which distinguishes the device is in the combination, with the recording-surface and reciprocating or oscillating marker-support usually employed in apparatus of this character, of a fluid-level for operating or shifting the marker, and in the combination, with such fluid-level and in operative connection with the marker-support, of a pendulum for overcoming the weight and friction of the movable parts of the said marker-support.

The construction and mode of operation of this and other improvements will be described by reference to the drawings.

Figure 1:
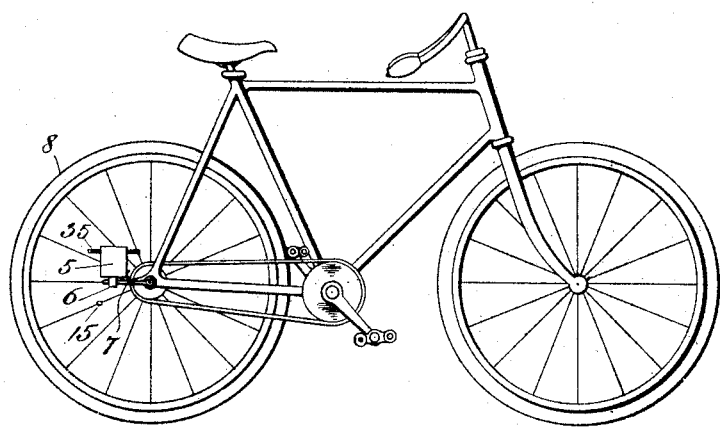
Figure 2:
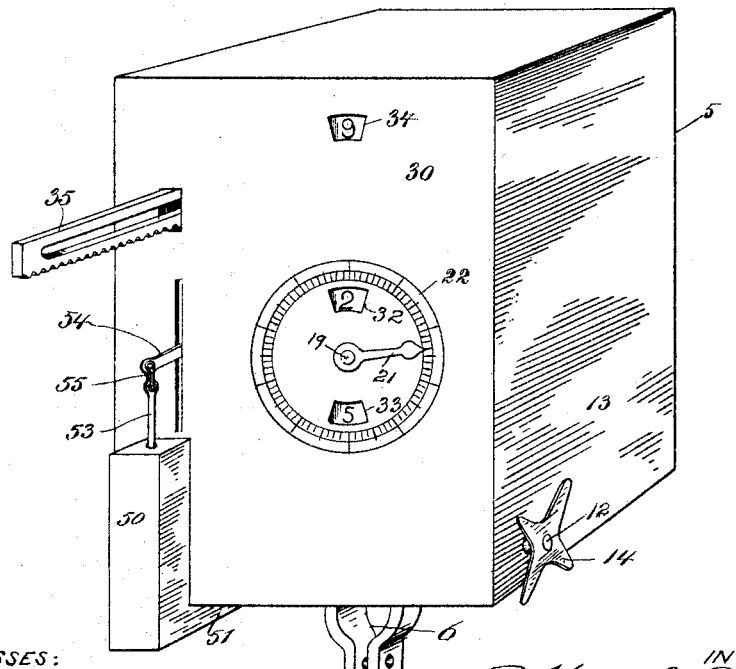
Figure 3:
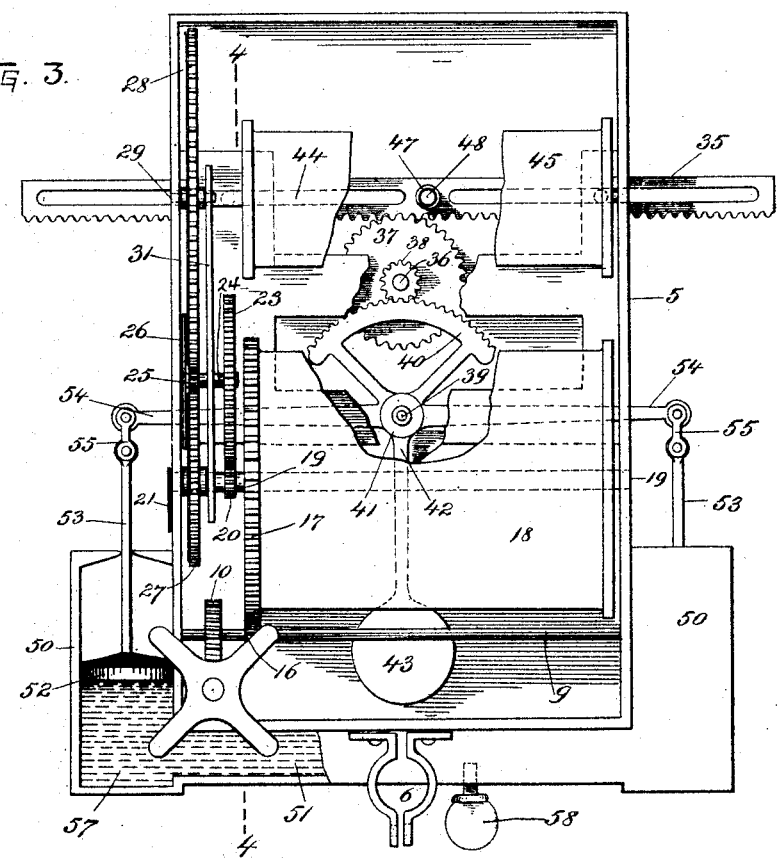
Figure 4:
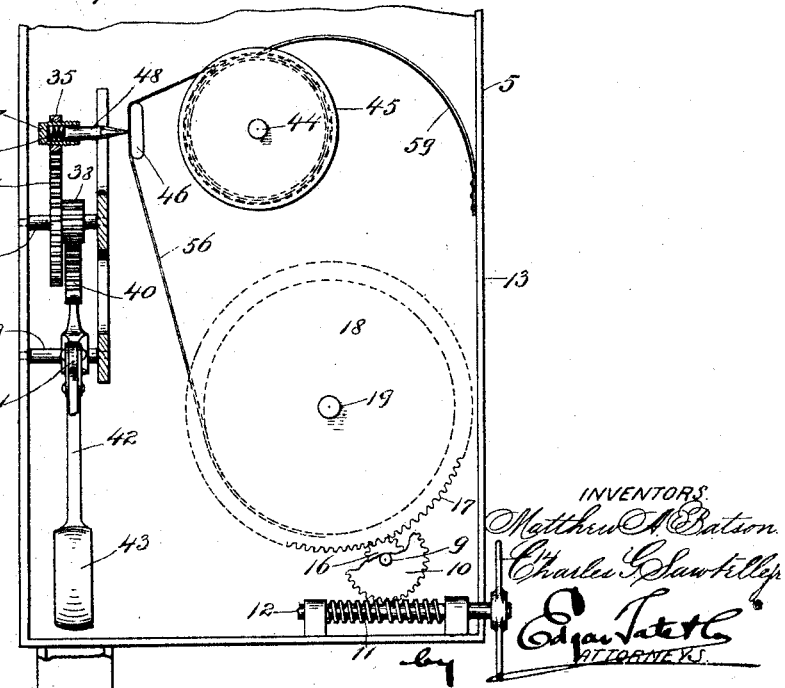

Figure 1 is a side view of a safety-bicycle of usual construction to which the improvement is attached. Fig. 2 is a perspective view of the improved grade-delineator on an enlarged scale. Fig. 3 is a rear view of the same with the back of the casing removed, and Fig. 4 is a section on line 4 4 of Fig. 3.

The operative portions of the device are contained in a box or casing 5, of sheet metal or other suitable material and preferably rectangular in form. This casing is provided with a clamp 6, by means of which it is attached to one of the bars 7 of the frame of the bicycle or other vehicle. In the present instance it is secured in close proximity to the rear or driving wheel 8, in order that the mechanism hereinafter described may be conveniently operated by said wheel. Mounted in the casing is a shaft 9, carrying a gear-wheel 10, operated by a worm 11 on a shaft 12, one end of which projects through the casing, as shown in Fig. 2, and carries a star-wheel 14, with the teeth of which engages a lug 15 on one of the spokes of the wheel 8. The shaft 9 carries also a pinion 16, which engages with a large gear-wheel 17, mounted on the shaft 19 of a roller 18. The said shaft 19 extends through the casing and carries a pointer 21, which moves over a dial-plate 22, graduated to represent fractions of a mile. A pinion 20 on the shaft 19 meshes with a gear-wheel 23, which is mounted on a shaft, on which is also a pinion 25 and a register-wheel 26. The pinion 25 engages with a gear-wheel 27, which also serves as a register-wheel, and it also operates a large gear-wheel 28 on a shaft 29 and which serves also as a register-wheel. The shafts of wheels 27 and 28 are supported by the side 30 of the casing and plate 31, in which they have bearings.

The wheel 26 is the units-wheel of the distance-indicating mechanism, and the numerals on its face show through a hole 32 in the dial-plate 22. The gear-wheel 27 exposes through the opening 33 the numerals that represent tens, and the wheel 28 exposes through an opening 34 the numerals indicating hundreds. The principle of the construction and operation of these parts is well understood.

Parallel with the roller 18, but above and to one side thereof, a rack-bar 35 is arranged to pass through the casing, in gear with a wheel 37 on a shaft 36, carrying a pinion 38, which in turn meshes with a segmental gear 40 on a shaft 39. To the hub 41 of said segmental gear is secured an arm 42, carrying a weight or bob 43 and constituting a pendulum.

Mounted in front of the rack-bar 35 is a shaft 44, carrying a roller 45, between which and the rack-bar is a stationary plate 46. The said rack-bar is provided at its center with a socket 47, in which is inserted a pencil or marker 48, pressed forward against the plate 46 by a spring 49.

On opposite sides of the casing and near the bottom of the same are secured cylinders 50, connected at the bottom by a transverse tube 51, and these cylinders are partially filled with a heavy fluid, such as mercury, as shown at 57. In each cylinder is a piston or plunger 52, provided with a rod 53, extending up through openings in the tops of the cylinders and pivotally connected with the opposite ends of an arm 54, rigid with the hub 41 of the segmental gear 40, the connection being made by links 55. These devices constitute a fluid-level which controls the inclination of the arm 54, the operation being facilitated and aided by the pendulum, which has sufficient weight to overcome and counterbalance the weight and friction of the moving parts of the system. The fluid-level also operates as a retarding device for the pointer and pendulum, as it does not respond to slight and momentary movements of the vehicle with the same sensitiveness as the pendulum.

In conjunction with the rollers 18 and 45 there is used a strip of paper or paper reinforced by a fabric and preferably ruled off into divisions by horizontal and perpendicular lines in the usual manner. This paper strip may have any desired width and length and is wound on the roller 45, passed over the plate 46, and secured to the roller 18, whereby in the operation of the device and by the revolution of the driving-wheel 8 motion is imparted to the roller 18, which unwinds the paper from roller 45, carrying it over the plate 46, upon which the point of the marker bears. A brake-spring 59 bears upon the roller 45. By this operation the grade of the road is indicated by the line which the marker traces on the paper strip as the pendulum and level, responding to changes in the position of the vehicle, shift the rack-bar to one or the other side of a central line of the paper. To regulate the rate of flow of the mercury from one cylinder to the other, a valve 58 may be employed in the connecting-tube 51.

By means of the above-described apparatus the distance traveled by a vehicle to which said apparatus is attached will be directly indicated by the cyclometer mechanism and also by the length of the line traced by the marker along the paper. The grade for all portions of the route traveled over will also be indicated by the elevation of the line thus traced with respect to the arbitrary center or base line.

We are aware that a marker has been combined with a pendulum for the purpose of delineating grades in instruments of this character and do not claim this broadly; but

What we claim as new and of our invention is—

1. In a grade-delineator the combination with the running-gear of a vehicle, of a movable indicator, a pendulum connected with and adapted to move said indicator and a retarding device connected with the pendulum, as set forth.

2. In a grade-delineator the combination with means for supporting and moving a recording-surface operated by and in correspondence with the movement of the vehicle to which it may be attached, of a marker mounted in contact with such surface, a reciprocating support therefor, a fluid-level and connections between the same and the marker-support whereby the position of the marker with respect to a central point will be determined by the inclination of the vehicle and the corresponding change of the level, as set forth.

3. In a grade-delineator adapted to be mounted on and operated by a vehicle, a mechanism for carrying and operating a movable recording-surface, a reciprocating frame, a marker carried thereby, cylinders communicating at the bottom and containing mercury, and pistons resting on the mercury and connected with and controlling the movement of said reciprocating frame, as set forth.

4. In a grade-delineator adapted to be mounted on and operated by a vehicle, a mechanism for carrying and operating a movable recording-surface, a reciprocating support, a marker carried thereby, cylinders communicating at the bottom and containing mercury, pistons resting on the mercury and connected with and controlling the movement of said reciprocating support, and a pendulum also connected with said support to assist in and facilitate its operation, as set forth.

5. In a grade-delineator for bicycles and other vehicles adapted to be mounted on the frame of said vehicle, the combination of a mechanism for carrying and operating a recording-surface operated by a wheel of said vehicle, a rack-bar mounted so as to move transversely to the recording-surface, a marker carried thereby, mercury-cylinders communicating at the bottom, pistons working therein intermediate gearing between the pistons and the rack-bar, and a pendulum also geared to said rack-bar, as and for the purpose set forth.

6. A grade-delineator for bicycles and other vehicles comprising a casing adapted to be connected with the frame of the vehicle, a shaft mounted in said casing and adapted to be turned by a wheel of the vehicle, a roller in gear with said shaft, a second roller parallel with the first, said rollers being adapted to receive a recording-strip of paper, a plate or support mounted adjacent to the rollers and over which the paper strip is adapted to be passed, a reciprocating rack-bar parallel with said plate or support, and carrying a marker which bears upon the paper as the latter passes over the said plate or support, a pendulum pivotally supported below the rack-bar and in gear therewith, cylinders at opposite sides of the casing, communicating at their lower ends and containing mercury, and pistons therein connected with the opposite ends of an arm rigid with the pendulum, as set forth.

7. In an apparatus of the kind herein described, the combination of a casing secured to the frame of a vehicle, a shaft therein adapted to receive motion from one of the wheels, a roller within the casing and in gear with said shaft, a second roller parallel with the first, said rollers being adapted to carry and move a recording-strip, a support mounted parallel with the roller over which said strip is passed, a rack-bar mounted parallel with said support and carrying a marker which is adapted to bear thereon, a fluid-level and connections between the same and the rack-bar, and a distance-recorder or cyclometer in gear with the driving-train, as herein set forth.

In testimony that we claim the foregoing as our invention we have signed our names, in presence of the subscribing witnesses, this 2d day of September, 1896.

MATTHEW ARLINGTON BATSON.
CHARLES GREENE SAWTELLE, Jr.

Witnesses:
W. W. HILL,
CHARLES S. ROGERS.